J. A. HARNSBERGER.
PEANUT PLANTER.
APPLICATION FILED AUG. 9, 1916.
1,331,341.  Patented Feb. 17, 1920.
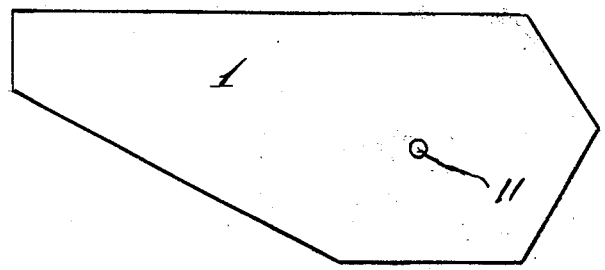
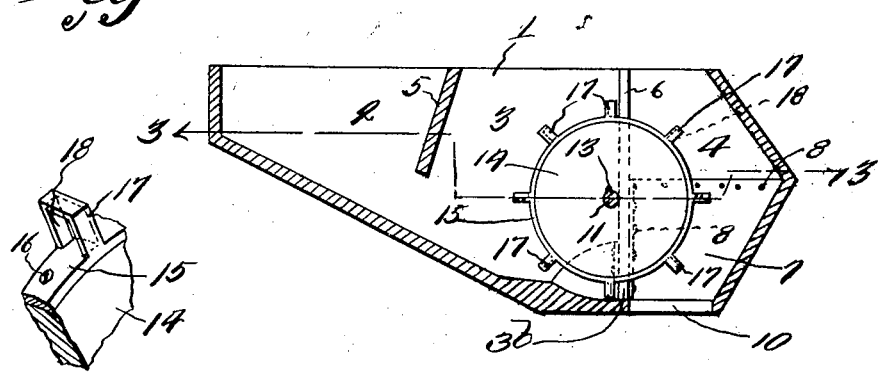
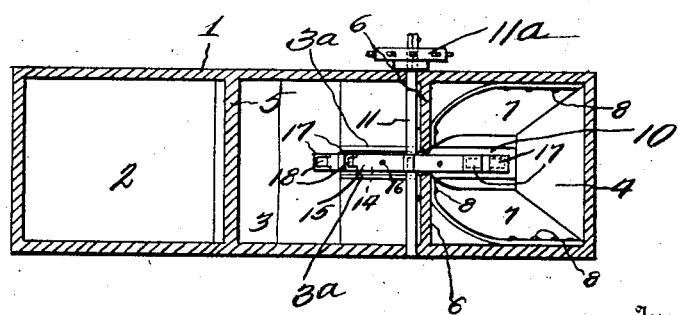
Inventor
J. A. Harnsberger

UNITED STATES PATENT OFFICE.

JOSEPH ADAM HARNSBERGER, OF CHICO, TEXAS.

PEANUT-PLANTER.

1,331,341.  Specification of Letters Patent.  Patented Feb. 17, 1920.

Application filed August 9, 1916. Serial No. 113,943.

*To all whom it may concern:*

Be it known that I, JOSEPH ADAM HARNSBERGER, a citizen of the United States, residing at Chico, in the county of Wise, State of Texas, have invented a new and useful Peanut-Planter; and I do hereby declare the following to be a full, clear, and exact description of the invention, such as will enable others skilled in the art to which it appertains to make and use the same.

This invention relates to the art of planting machines, seeders and the like, and particularly to an improved peanut planting machine, and an object of the invention is the provision of an improved machine of this kind comprising simple, efficient and practical features of construction.

Another object of the invention is the provision of a suitable hopper for the seed or the like, in combination with a revoluble member having a plurality of pockets thereon, to pick up the seed one or two at a time and discharge the seed through an opening in said hopper.

Another object of the invention is the provision of side plates in the forward portion of the hopper to deflect the seed through the opening of said hopper.

Another object of the invention is to provide means to prevent the seed in the seed containing compartment of the hopper from working back toward the opening in the bottom of the hopper through which the seed passes.

In practical fields, the details of construction may necessitate alterations, falling within the scope of what is claimed.

The invention comprises further features and combination of parts, as hereinafter set forth, shown in the drawings and claimed.

In the drawings:—

Figure 1 is a view in side elevation of the improved peanut planting machine constructed in accordance with the invention.

Fig. 2 is a sectional view.

Fig. 3 is a sectional view on line 3—3 of Fig. 2.

Fig. 4 is a detail perspective view of a portion of the revoluble member or wheel, showing one of the pockets.

Referring more especially to the drawings, 1 designates the frame of the machine, which is of the shape in side elevation as shown in Figs. 1 and 2, and rectangular in plan view as shown in Fig. 3. This frame constitutes a hopper, which is divided into three compartments, 2, 3 and 4, by the partitions 5 and 6. The forward compartment 4 is provided with side deflecting plates 7, secured at 8 to the partition 6, and to the inner faces of the sides of the frame. The bottom of the compartment 4 is provided with an opening 10, through which the seed or other grain may pass, so as to fall in the furrow. Mounted in bearings of the frame is a transverse shaft 11, which may be geared by means of the sprocket $11^a$ to any suitable planting machine or the like (not shown). Keyed upon the shaft 11 by means of the feather 13 is a revoluble disk 14, upon the peripheral edge of which an annular band 15 is secured by the screws or the like 16. This band is provided with a plurality of projections 17 having pockets 18, so that as the disk rotates, the pockets will pick up the seed or the like, particularly the peanut seed, one or two at a time, from the intermediate compartment 3, and as the revoluble disk rotates, the seed will drop from the pockets through the compartment 4 and be deflected by the side plates 7 through the opening 10 of the bottom of the compartment, from which opening the seed passes into the furrow. By mounting the pockets on the revoluble disk in this manner, it will be seen that the band 15 may be easily removed for repairs. Arranged adjacent the bottom of the compartment 3 and secured to the partition 6 is a pair of plates $3^a$, one upon each side of the revoluble disk 14, and between which plates the projections 17 pass as the disk 14 rotates. These two plates act to prevent the seed from working through the opening $3^b$ at the lower central portion of the partition. The lengths of these two plates or flanges $3^a$ together with the thickness of the lower side parts of the partition 6 are greater than the space between the projections 17, so that when one projection is about to pass from between the flanges in the rear compartment, the next projection 17 is just in the act or approximately entered the opening $3^b$, thereby preventing the seed in the rear compartment outside the space between the flange from passing through the opening $3^b$. In other words the opening $3^b$ and the space between the flanges $3^a$ is at all times blocked, hence preventing the forward passage of the seed. This device may be applied or geared to any conventional form or construction of planter, or to any other suitable machine, so that motion may be imparted to the disk 14.

The invention having been set forth, what is claimed as new and useful is:—

1. In a planter, a hopper having forward and rear compartments, the forward compartment having an opening in its bottom, a dividing partition between the two compartments having an opening connecting the two compartments, a circular disk feeding member for transferring the seeds from the rear to the forward compartment mounted adjacent said partition, and provided with radial pockets at spaced intervals about the member, and flanges, one upon each side of said member adjacent the opening of the partition, the length of said flanges plus the thickness of the partition being greater than the interval between any two radial pockets, thereby preventing the seeds from passing from the bottom of the rear compartment outside the space between the flanges through the opening of the partition.

2. In a peanut planter, a hopper having a partition dividing the same into forward and rear compartments and having a central opening of communication between said compartments, the bottom of the forward compartment having an opening adjacent the lower part of the opening in the partition, a disk feed member mounted in the hopper and rotating in the opening of the partition, a band secured to and surrounding the marginal edge of the member and having integral radial projections at spaced intervals provided with pockets designed to pick up the peanuts from the rear compartment and feed them over into the forward compartment and through its bottom opening, and flanges, one upon each side of the member and secured to the partition adjacent the lower part of the opening therein, the length of the flanges plus the thickness of the partition being greater than the interval between any two pockets, thereby preventing the passage of the peanuts outside the space between the flanges from the rear to the forward compartment.

3. The combination with a hopper having forward and rear compartments, of a transverse partition comprising separate parts projecting toward each other from opposite sides of the hopper, thereby separating the forward and rear compartments, the adjacent edges of the separate parts of said partition being spaced, an opening in the bottom of the forward compartment, deflecting plates secured to the parts of said partition adjacent the spaced edges of said parts and being curved toward and secured to the sides of the forward compartment and being inclined downwardly to said opening for deflecting and feeding the grain or seeds through the opening, a shaft mounted in bearings of the sides of the hopper, a feeding element comprising a disk mounted on and movable with the shaft, a circular band on the disk and having radial seed feeding pockets at spaced intervals, to carry the seed from the rear to the forward compartment, and flanges at the lower portions of the parts of the partition in the rear compartment, to prevent the seed from passing into the forward compartment.

In testimony whereof I have signed my name to this specification in the presence of two subscribing witnesses.

JOSEPH ADAM HARNSBERGER.

Witnesses:
W. U. BLACKER,
C. C. HAWKINS.